United States Patent Office 3,398,515
Patented Aug. 27, 1968

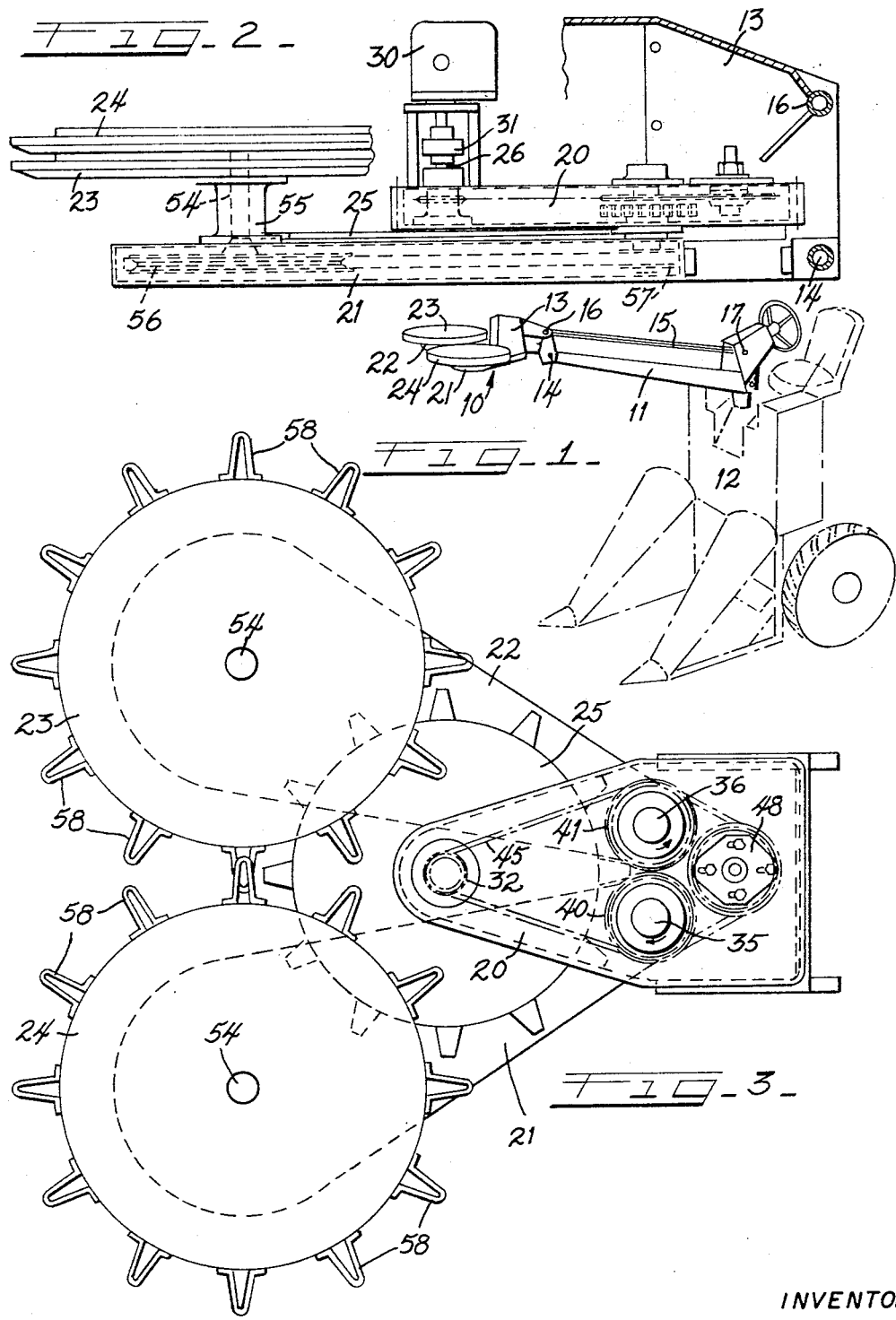

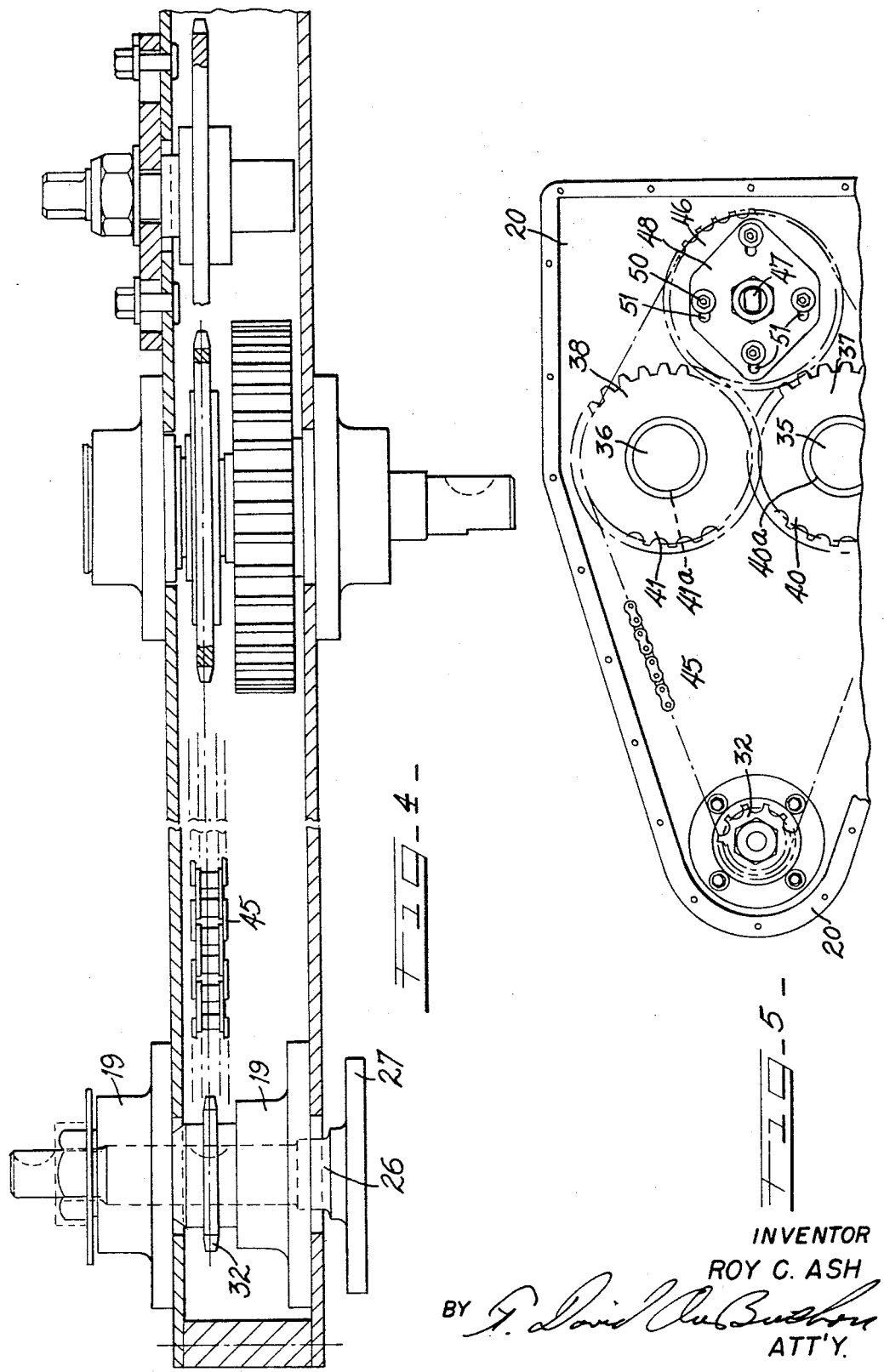

3,398,515
TOPPING MECHANISMS FOR CANE HARVESTERS
Roy Cecil Ash, Ingham, Queensland, Australia, assignor to International Harvester Company, a corporation of Delaware
Filed Dec. 27, 1965, Ser. No. 516,467
Claims priority, application Australia, Dec. 29, 1964, 53,420/64
7 Claims. (Cl. 56—63)

This invention relates to a topping mechanism for cane harvesters and in particular to the construction of the drive for the cutter and gathering devices of the topping mechanism.

It is customary for the topping mechanism to include a rotary cutter and a pair of gathering devices arranged to direct the tops of the cane sticks inwardly and rearwardly to the cutter as the harvester travels along a row of cane. For simplicity and economy, the cutter and each gathering device is normally driven from a common drive shaft or motor through a suitable transmission arranged to give the desired direction of movement of the respective components.

It is desirable in a topping mechanism to be able to reverse the direction of rotation of the cutter so that the tops cut from the cane sticks are delivered to one or the other side of the harvester, so that as the direction of travel of the harvester through the cane field is reversed, the tops are always discharged away from the remaining standing crop. However, the direction of movement of the gathering devices must remain the same irrespective of the direction of rotation of the cutter so as to perform their function of directing the tops towards the cutter, and it is therefore the principal object of the present invention to provide a simple and effective drive transmission in a topping mechanism for a cane harvester which will permit reversal of the rotation of the cutter independent of the direction of movement of the gathering devices.

With the above stated object in view, there is provided according to the present invention a topping mechanism for a cane harvester comprising a rotary cutter, a pair of gathering devices projecting forwardly of the cutter, each having a plurality of fingers constrained to move along respective pre-determined paths to direct the cane tops inwardly and rearwardly between the gathering devices to the cutter, a reversible motor drive coupled to the cutter so that the rotation of the cutter is reversed with reversing of the motor, two drive shafts coupled to each other to rotate in opposite directions and driving the gathering devices, an endless driving member coupling each shaft to the motor through respective one way clutch mechanisms arranged to drive one or the other of the shafts in mutually opposite directions in response to reversal of the direction of movement of the endless driving member upon reversal of the motor.

Conveniently, the endless driving member is a chain or belt passing around complementary sprockets or pulleys mounted on the respective drive shafts and coupled thereto by respective one way clutches incorporated in the hub of the sprocket or pulley. The belt or chain is driven by the motor which may be coupled directly to the shaft carrying the cutter, and the drive shafts of the gathering devices are connected by a gear train so that rotation of one shaft effects rotation of the other in the opposite direction.

Thus when the motor is running in one direction, the belt or chain will drive the shaft of one of the gathering mechanisms through the associated one way clutch and this shaft will in turn drive the shaft of the other gathering mechanism through the gear train. The one way clutch associated with the other drive shaft would be idle and not transmit any power to the shaft. When the direction of the motor is reversed, the drive would take place through the other one way clutch and thus the drive shaft of the gathering mechanisms would continue to rotate in the same direction.

The invention will be more readily understood from the following description of one practical arrangement of the topping mechanism as illustrated in the accompanying drawings.

In the drawings:
FIGURE 1 is an illustrative perspective view of the front section of a cane harvester.
FIGURE 2 is a side elevation of the topping mechanism.
FIGURE 3 is a plan view of the topping mechanism with the motor and its support removed.
FIGURE 4 is a sectional elevation of the gear box of the topping mechanism; and
FIGURE 5 is a partial plan view of the gear box in FIGURE 4 to a smaller scale.

Referring now to FIGURE 1, the topping mechanism 10 is mounted on the forward end of a boom 11 which is pivoted at its rear end to the frame of a harvester 12 to permit raising and lowering of the topping mechanism in accordance with the height of the crop being harvested. A topping mechanism support frame 13 is pivoted to the boom 11 at 14 and a link 15 is pivoted to the support frame 13 at 16 and to the harvester 12 at 17 forming a parallel linkage with the boom so that the topping mechanism will maintain a substantial horizontal disposition at all operating positions.

A gear box 20 is mounted centrally in the support frame 13 and forwardly and outwardly projecting drive boxes 21 and 22 are mounted on the support frame and support the respective gathering discs 23 and 24 at their free forward ends. The drive boxes 21 and 22 in effect are a part of frame 13.

A rotary topper cutter 25 is disposed below the gear box 20 and is mounted upon a flange 27 at the lower end of the cutter shaft 26 journalled in bearings 19 in the gear box. (See FIGURE 4.) A reversible hydraulic motor 30 is mounted on the frame 13 above the gear box 20 and is connected to the upper end of cutter shaft 26 by means such as a flexible coupling 31. (See FIGURE 2.) A drive sprocket 32 is keyed to the cutter shaft 26 within the gear box 20.

Two stub shafts 35, 36 are journalled in bearings 28 in the gear box 20 and the lower ends thereof project through the underside of the gear box into the respective drive boxes 21 and 22. Gears 37, 38 are fixedly mounted on the respective stub shafts 35, 36 within the gear box 20, and mesh with each other so that the stub shafts must rotate in opposite directions. The gears 37, 38 have an equal number of teeth so that the stub shafts will rotate at the same speed.

Driven chain sprockets 40, 41 are mounted on the stub shafts 35, 36 respectively and each includes in the hub thereof a one way clutch 40a, 41a to effect driving engagement between the sprockets and the stub shafts. The one way clutches are arranged so that sprocket 40 will only drive stub shaft 35 in a clockwise direction and sprocket 41 will only drive stub shaft 36 in a counterclockwise direction as viewed in FIGURE 3.

A chain 45 passes around the sprockets 32, 40, 41 and a tensioning sprocket 46 journalled on a shaft 47 that is mounted on a plate 48. Elongated holes 51 are formed in the plate 48 through which bolts 50 pass to attach the plate to the top wall of the gear box 20. The tension on the chain 45 is adjusted by moving the plate 48 relative to the gear box 20.

The gathering discs 23 and 24 are attached upon the upper ends of gatherer shafts 54 that are journalled in bearings 55 mounted on the upperside of the respective drive boxes. The lower ends of the shafts 54 project into the respective drive boxes and have coupled thereto respective V-belt pulleys 56 which are connected by belts to smaller V-belt pulleys 57 mounted on the lower ends of the stub shafts 35 and 36. Thus V-belt pulleys 56, 57 and their associated belts constitute means for transmitting rotary motion from stub shafts 35 and 36 to the rotary gathering devices 23 and 24.

A plurality of radially projecting fingers 58 are attached to each gathering disc at equal intervals around the periphery of the gathering discs. The discs are arranged so that the paths of the fingers on the respective discs overlap during the innermost portion of their travel, and rotate in directions so that the fingers move rearwardly towards the cutter 25 during the inner portion of their path of travel. Thus as the harvester advances the tops of the cane stalks are directed inwardly and rearwardly towards the cutter 25.

With the above described drive transmission between the reversible hydraulic motor 30, the cutter 25 and the gathering discs 23, 24 the direction of rotation of the cutter 25 can be reversed by reversing the motor 30, but the gathering discs will always rotate in the same direction.

When the motor is operated to rotate the cutter in the clockwise direction as viewed in FIGURE 3, the sprocket 40 will be rotated in the clockwise direction, and the one way clutch in the sprocket 40 will engage and rotate stub shaft 35 in the clockwise direction. As the chain 45 is rotating sprocket 41 in a clockwise direction, the one way clutch associated with sprocket 41 will not transmit drive to the shaft 36. However, due to the meshing of gears 37 and 38, the shaft 36 will be driven in a counterclockwise direction by the shaft 35, and hence gathering disc 23 will be rotated in a counterclockwise direction while disc 24 is rotated clockwise.

Upon reversing the direction of operation of the motor 30 so that the cutter 25 is rotated in a clockwise direction, as viewed in FIGURE 3, the sprocket 41 will be rotated in a counterclockwise direction and the one way clutch therein will engage and rotate the shaft 36 in a counterclockwise direction. No drive will be transmitted to the shaft 35 by the sprocket 40 as the latter is being rotated in a counterclockwise direction but the shaft 35 will be rotated in the clockwise direction by the shaft 36 through the gears 37 and 38. Thus the directions of rotation of the stub shafts 35 and 36 and hence those of the gathering discs 23 and 24 are unchanged by changes in direction of rotation of the cutter.

It should be understood, of course, that the foregoing disclosure relates to only a preferred embodiment of the invention and that numerous modifications or alterations may be made therein without departing from the spirit and the scope of the invention as set forth in the appended claims.

What is claimed is:

1. A topping mechanism for a cane harvester comprising a frame having a rotary cutter mounted thereon, a pair of spaced rotary gathering devices connected to said frame and located forwardly of the cutter and adapted to direct the cane tops inwardly and rearwardly between the gathering devices toward the cutter, a reversible motor mounted on said frame, means coupling said reversible motor to said rotary cutter such that the rotary cutter is driven in the same direction as the rotary motor, a pair of stub shafts journalled on said frame, said stub shafts having engaging gears fixed thereto so that the shafts rotate in opposite directions, a one-way clutch associated with each of said stub shafts, said one-way clutches arranged to transmit rotary motion to said stub shafts in opposite directions, means coupling said reversible motor to said stub shafts through said one-way clutches such that said stub shafts rotate in only one direction regardless of the direction of rotation of said reversible motor, and means for transmitting the rotary movement of said stub shafts to said rotary gathering devices.

2. The invention as set forth in claim 1 wherein each of said stub shafts have a driven sprocket associated therewith and said sprockets are connected to the associated stub shafts through said one-way clutches.

3. The invention as set forth in claim 1 wherein said rotary gathering devices are disc-shaped and include a plurality of radially extended fingers projecting outwardly from the peripheral edges.

4. The invention as set forth in claim 1 wherein said reversible motor is a hydraulic motor.

5. A topping mechanism for a cane harvester comprising a frame having a cutter shaft journalled thereon, a rotary cutter carried by said cutter shaft, a pair of spaced gatherer shafts journalled on said frame forwardly of said cutter shaft, a rotary gatherer carried by each of said gatherer shafts, said gatherers adapted to direct cane tops inwardly and rearwardly between the gatherers to said rotary cutter, a reversible motor carried by said frame, means coupling said reversible motor to said cutter shaft so that the rotary cutter is driven in the same direction as the rotary motor, a pair of stub shafts journalled on said frame, said stub shafts having engaging gears fixed thereto so that the shafts rotate in opposite directions, each of said stub shafts having a sprocket connected thereto through a one-way clutch such that rotary motion can be transmitted from a sprocket to its associated stub shaft in only one direction, a sprocket carried by said cutter shaft, drive means connecting the sprocket carried by said cutter shaft to said sprocket carried by said stub shafts, and means for transmitting the rotary motion of said stub shaft to said gatherer shafts.

6. The invention as set forth in claim 5 wherein said reversible motor is a hydraulic motor.

7. The invention as set forth in claim 5 wherein said rotary gatherers are disc-shaped and include a plurality of radially extending fingers projecting outwardly from the peripheral edges.

References Cited

UNITED STATES PATENTS

| | | | |
|---|---|---|---|
| 2,179,584 | 11/1939 | Bourg | 56—17 |
| 2,648,943 | 8/1953 | Shafer et al. | 56—17 |
| 3,325,982 | 6/1967 | Fogels et al. | 56—56 |

ABRAHAM G. STONE, *Primary Examiner.*

P. A. RAZZANO, *Assistant Examiner.*